(12) United States Patent
Sion et al.

(10) Patent No.: US 6,769,064 B2
(45) Date of Patent: Jul. 27, 2004

(54) SYSTEM FOR PROTECTING SOFTWARE

(75) Inventors: Jérôme Sion, Paris (FR); Stéphanie Lion, Strasbourg (FR)

(73) Assignee: Schlumberger Systemes, Montrouge (FR)

( * ) Notice: Subject to any disclaimer, the term of this patent is extended or adjusted under 35 U.S.C. 154(b) by 209 days.

(21) Appl. No.: 09/739,308

(22) Filed: Dec. 18, 2000

(65) Prior Publication Data

US 2001/0034840 A1 Oct. 25, 2001

Related U.S. Application Data

(63) Continuation of application No. PCT/FR99/01439, filed on Jun. 15, 1999.

(30) Foreign Application Priority Data

Jun. 17, 1998 (FR) .............................. 98 07629

(51) Int. Cl.⁷ .................. G06F 11/30; G06F 17/60; G06F 12/14; H04L 9/32; H04L 9/00
(52) U.S. Cl. .................. 713/193; 713/191; 705/55; 705/57; 380/46
(58) Field of Search ................. 713/193, 191; 705/57, 55, 56, 51, 52; 380/46

(56) References Cited

U.S. PATENT DOCUMENTS

| 4,593,353 A | * | 6/1986 | Pickholtz | 705/55 |
| 4,757,534 A | * | 7/1988 | Matyas et al. | 705/56 |
| 4,953,209 A | * | 8/1990 | Ryder et al. | 705/59 |
| 5,148,481 A | * | 9/1992 | Abraham et al. | 380/46 |
| 5,483,597 A | * | 1/1996 | Stern | 380/30 |
| 5,652,793 A | * | 7/1997 | Priem et al. | 705/56 |

FOREIGN PATENT DOCUMENTS

EP 0 191 162 8/1986

OTHER PUBLICATIONS

Menezes, Alfred. Handbook of Applied Cryptography, 1997, CRC Press LLC, p. 172.*

* cited by examiner

Primary Examiner—Gilberto Barrón
Assistant Examiner—Benjamin E Lanier
(74) Attorney, Agent, or Firm—Cohen, Pontani, Lieberman & Pavane

(57) ABSTRACT

A system for protecting software that can be executed on a computer machine, the system being of the type in which the software is associated with a memory card for insertion in a reader connected to the computer machine. The software stores a public key, and periodically generates a pseudo-random number. A first algorithm is implemented by using the public key on information received from the reader. The result of implementing the first algorithm is compared with the pseudo-random number. Execution of the software is interrupted in response to such comparison. The card has protected storage means for storing an associated private key and means for implementing a second algorithm using the private key upon receiving information issued by the computer machine, thereby obtaining encoded information. The encoded information is transmitted from the card to the computer machine.

7 Claims, 3 Drawing Sheets

SYSTEM FOR PROTECTING SOFTWARE

This application is a continuation of international application number PCTFR99/01439, filed Jun. 15, 1999 (status, abandoned, pending, etc.).

FIELD OF THE INVENTION

The present invention relates to a system for protecting software. More precisely, the invention relates to a system for protecting software that can be executed on a computer machine. The system is of the type in which the software to be protected is associated with a memory card for insertion in a read/write device connected to the computer machine, the presence of the card being required continuously throughout execution of the software.

In the present description, the term "software" is used to cover not only computer software in the usual sense, but also an executable file, an image file, a video file, a sound file, etc. Similarly, the term "computer machine" is used to cover any machine capable of executing software such as PCs, portable telephones, set-top boxes, or games consoles. Finally, the term "memory card" is used to cover any removable medium including memory circuits and, in particular, a microprocessor.

BACKGROUND OF THE INVENTION

To protect software against its unauthorized use, the main solution presently in existence on the market uses a component in the form of an application-specific integrated circuit (ASIC) and referred to as a "protective key" incorporated in a device known as a "dongle". Such dongles need to be connected to the parallel port of the computer on which the software is being executed in order to enable the protected software to operate properly. The principle of using a dongle is as follows: each piece of software is associated with a dongle. The dongle and the software are personalized with one or more keys by the software developer. Once installed on the computer, the software makes calls to the dongle in order to verify that it is present and that the keys are valid. Each call is in the form of a question and a response. For each question (implemented as a string of characters), the dongle returns a predefined response that is known to the software. If the response to a question is different from the expected response then the software locks up to prevent further use thereof.

More sophisticated "dongles" use an encryption system generated by a hardware system which enables a character string to be transformed in a determined manner. These models are easily "broken" by reverse engineering.

U.S. Pat. No. 5,083,309 discloses a system for using software in a secure manner. The system includes using an electronic memory card in which a portion of the data and/or of the software is stored and made inaccessible by the circuits of the electronic memory card itself. That solution provides a high degree of protection, but it is relatively cumbersome to implement because a portion of the software needs to be stored in the card which executes certain portions of the software.

OBJECTS AND SUMMARY OF THE INVENTION

An object of the present invention is to provide a system for protecting software using an electronic memory card in association with the software, which system likewise provides a high degree of protection but without requiring a large quantity of information, and in particular without requiring pre-storing in the memory card elements of the software to be protected and which does not require secret information to be generated by the software or by the file contained in the computer system.

This and other objects are attained in accordance with one aspect of the invention directed to a system for protecting software executable on a computer machine, the system being of the type in which the software is associated with a memory card adapted for insertion in a read/write device connected to the computer machine. The software includes means for storing a public key or value, and means for periodically generating a pseudo-random number and for transmitting the pseudo-random number to the read/write device. Another means implements a first algorithm using the public key or value on information received from the read/write device. A comparator compares the result of implementing the first algorithm with the pseudo-random numbers, and the execution of the software can be interrupted depending on the comparison.

The card includes protected memory means for storing an associated private value or key. A means is provided for implementing a second algorithm associated with the first algorithm and using the private value or key on received information issued by the computer machine, thereby obtaining encoded information. The encoded information is transmitted to the computer machine.

It will be understood that in such a system, the computer machine sends a message to which the response is the same message, but as encrypted using the algorithm stored in the circuits of the card. An associated algorithm is stored in the software. It is thus possible for the message to be in the form of any numbers or data generated in pseudo-random fashion, and the response is determined by the algorithm stored in the card. The number of messages and responses is thus infinite.

To implement such a system, the first and second algorithms are public key algorithms or zero disclosure algorithms. The card contains the private key in its memory and the software contains the associated public key. It will be understood that the public key is accessible in the software but that does not lead to a failure in protecting the software. In contrast, the private key is stored in the circuit of the electronic memory card which makes access to this information if not impossible, at least extremely difficult. This implementation thus provides maximum protection.

In a first implementation, each piece of software includes its own public key and the card includes its own private key. It is therefore necessary to have one card per piece of software. In a second implementation, the public keys and the private keys are all the same for all instances of the same piece of software. The number of instances of the software that can be executed simultaneously is thus under control since this number is limited by the number of cards.

In an improved implementation, the system further comprises network means for downloading said software from a supplier and into the computer machine, means using said card to request said supplier to supply the private key associated with said software over the network, and means for receiving in return said private key in encrypted form and for decrypting it in the card so as to store it in decrypted form.

BRIEF DESCRIPTION OF THE DRAWINGS

The following description of various implementations of the invention are given by way of non-limiting example and refers to the accompanying figures, in which.

DETAILED DESCRIPTION OF THE DRAWINGS

Figure 1:
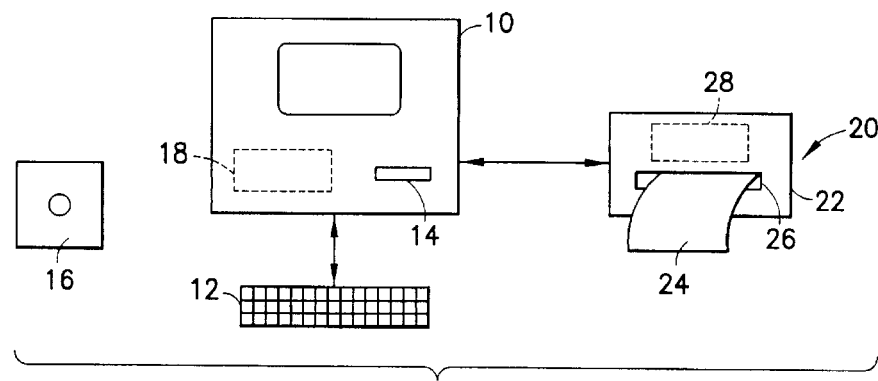
FIG. 1 is a view of a computer installation for implementing the software protection system.

The system for protecting use of a piece of software is initially described with reference to FIG. 1. The system comprises a main unit for running the software, referred to as a "computer machine" 10 of conventional type. The figure shows a data input keyboard 12, the slot 14 of a reader for a digital data medium 16, and the main memory or hard disk 18 of the main unit. The main unit 10 is associated with an auxiliary unit 20 which consists in a read/write device for an electronic memory card 22. The read/write device 22 essentially comprises a system for guiding the memory card 24 represented merely by an insertion slot 26, a connector that is not shown, and a processor circuit 28. The processor circuit 28 serves merely to receive information sent by the main unit 10 or for sending thereto information it has read from the card, and to control the operations of reading or writing in the integrated circuit of the card 24.

Figure 2:
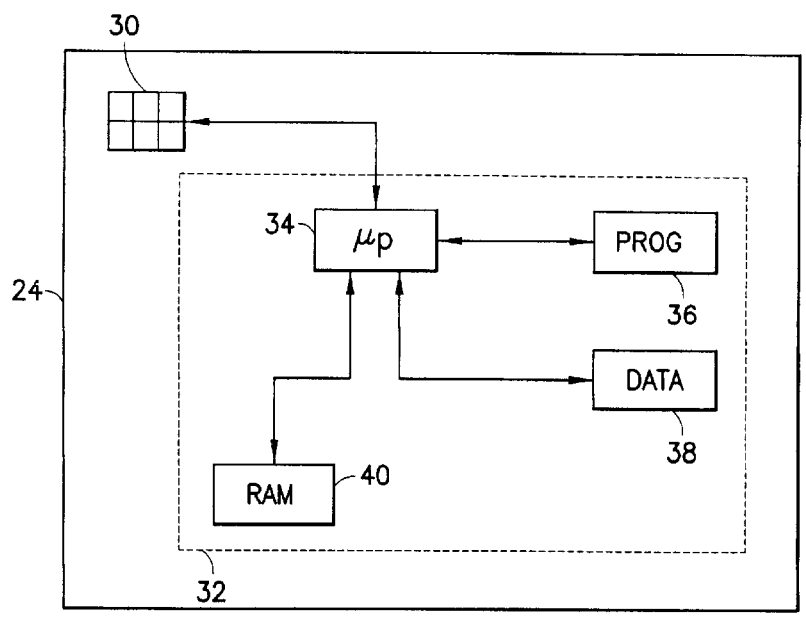
FIG. 2 is a block diagram of the circuit of an electronic memory card.

FIG. 2 is a diagram of the main circuits in the electronic module of the memory card 24. There are external contacts 30 which provide electrical connection between the circuits 32 of the card and the circuits 28 of the read/write device. The circuits 32 essentially comprise a microprocessor 34 which is connected to the external contacts 30, the microprocessor 34 being associated with a non-volatile program memory 36, with a non-volatile data memory 38, and with a working memory 40 of the random access type (RAM).

Figure 3:
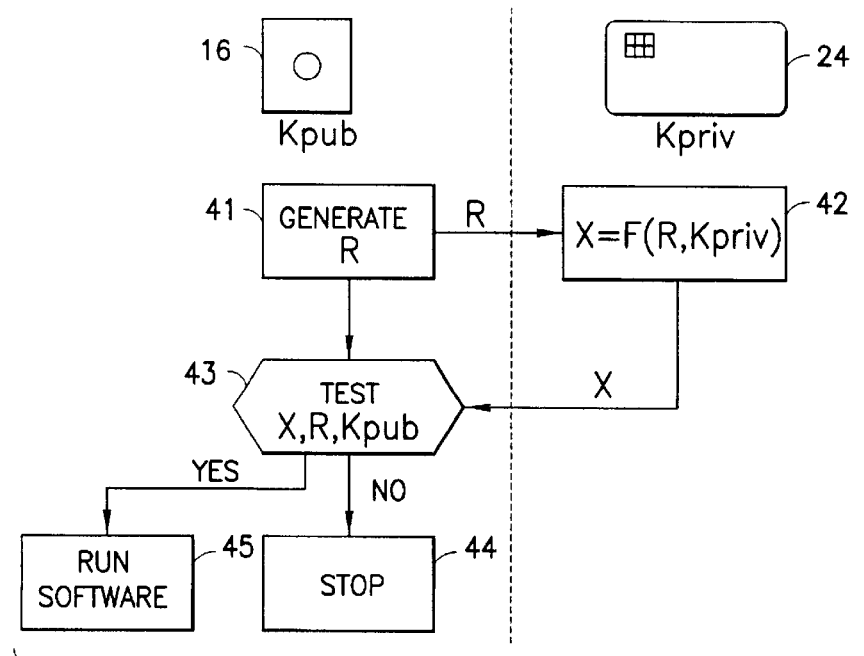
FIG. 3 is a flow chart showing a first implementation of the protection system using a zero knowledge algorithm.

A first implementation of the system for protecting software stored on the floppy disk 16 or on any other digital data medium by means of the electronic memory card 24 having a microprocessor is described below with reference to FIG. 3. In this implementation, a zero knowledge algorithm is used. In addition to containing instructions corresponding to the software proper, the disk 16 also includes program or instruction elements specific to implementing protection. These specific elements comprise firstly a subprogram 41 for generating random numbers R, and a subprogram 43 for implementing a first test algorithm using a public key $K_{pub}$ which is stored in the subprogram 43. With reference now to the electronic memory card 24, in this first implementation, the program memory 38 has a subprogram 42 for implementing a message/response, or question/response, zero knowledge algorithm F with a private key $K_{priv}$. The private key is stored in the data memory of the card. This algorithm F is associated with the first test algorithm, as explained below, to enable the question/response zero knowledge algorithm to be implemented.

Periodically, the subprogram 41 for generating pseudo-random numbers R is implemented by the computer machine 10 to generate the pseudo-random number R which is transmitted to the read/write device 20 and then to the circuits of the card 24. Its microprocessor 34 implements the algorithm F applied to the pseudo-random number R by using its private key $K_{priv}$. A number X is thus obtained which is transmitted to the computer machine 10. Subprogram 43 of the software calculates a number X'=F' (R,$K_{pub}$).

Pseudo-random number R and $K_{pub}$ are inputs to function F'. The test then compares the value of X' with the value X. If the result of this comparison which involves the use of the public key $K_{pub}$ is incorrect, then either the memory card 24 is not valid or else it does not correspond to running the software. Implementing the question/response zero knowledge algorithm can require several iterations between the card and the reader as to subprograms 41, 42 and 43. In step 44, execution of the software is interrupted. In contrast, if the test is favorable, then the function for generating the random number R is again activated, per operation 45, possibly after a predetermined time lapse.

It will be understood that in this implementation, the above-described operation is run periodically, thereby ensuring firstly that an electronic memory card 24 is indeed present in the reader, and that in addition said card is indeed the intended card associated with the software that is being run.

Figure 4:
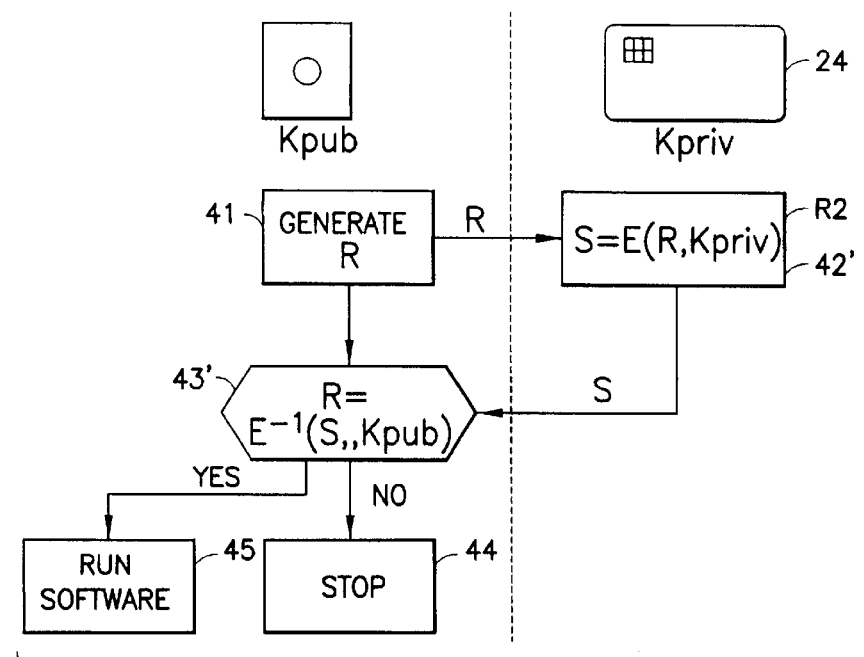
FIG. 4 is a flow chart showing a second implementation of the protection system.

Another preferred implementation is described below with reference to FIG. 4. This implementation uses as its encryption algorithm an algorithm E of the asymmetrical type, e.g. an algorithm of the RSA type (Rivest, Shamir, Aldeman).

To implement this protection system, the private key $K_{priv}$ is stored in the data memory 38 of the electronic memory card. The public key $K_{pub}$ is stored in the specific portion of the software stored on the digital data medium 16. The subprogram 41 for generating a random number R generates the number R and transmits it to the read/write device 20. The microprocessor of the electronic memory card implements the asymmetrical type encryption algorithm E in step 42' by using the private key stored in the memory of the card. A number S is thus obtained which is transmitted to the computer machine. The specific subprogram 43' of the software then calculates the inverse of S by using the first encryption algorithm $E^{-1}$, which is the inverse of E, and by using the public key $K_{pub}$, with the inverse of S subsequently being compared with the random number R. If the result of this comparison is positive, then per operation 45 the software causes a new random number R to be generated, possibly after a time lapse. Otherwise, execution of the software is interrupted.

Advantageously, in the first and second implementations, the subprogram 41 for generating a random number R can be stored in the memory of card 24 rather than in computer machine 10. Thus, unauthorized access to this number and subprogram 41 cannot be gained through computer machine 10.

Figure 5:
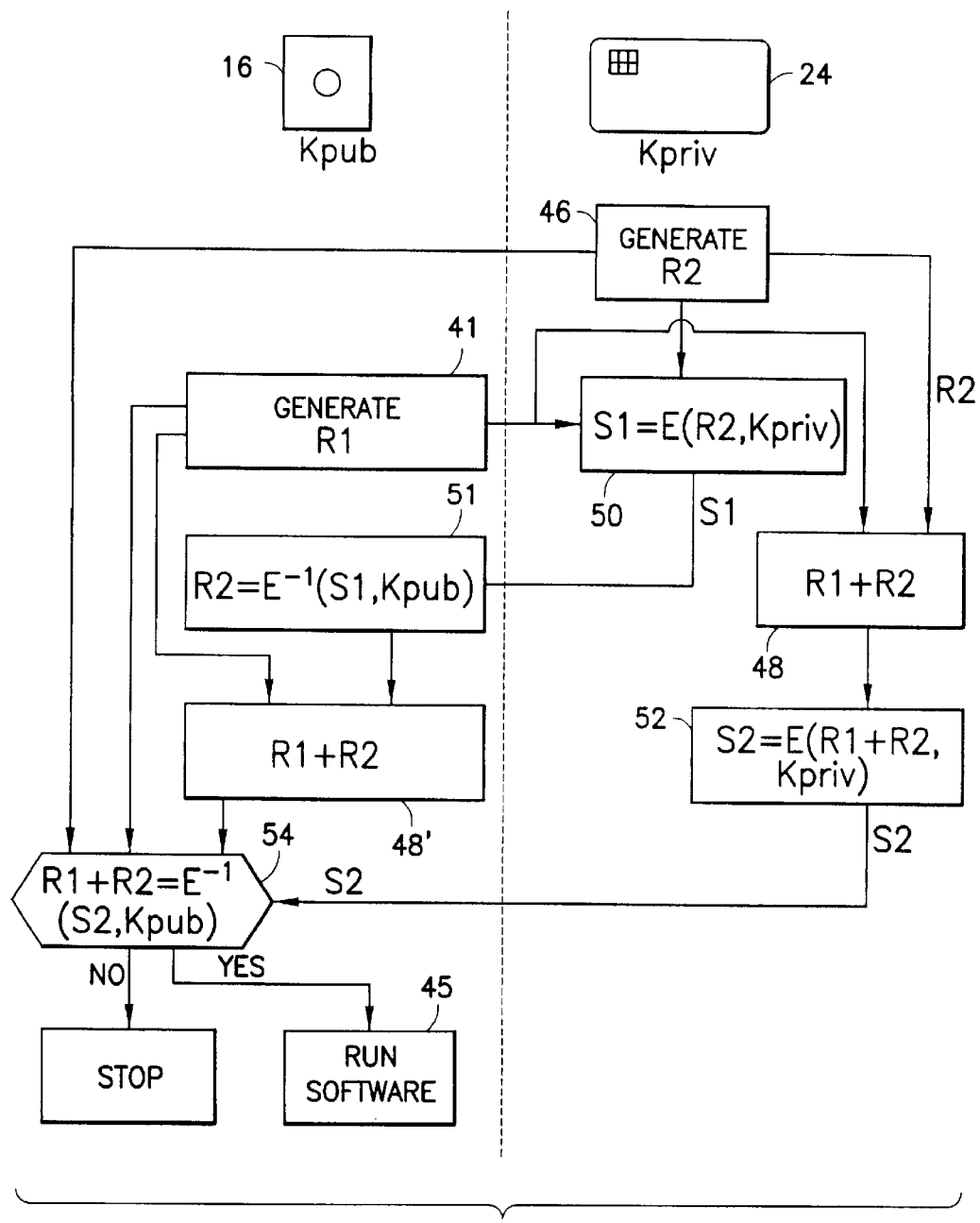
FIG. 5 is a flow chart showing a third implementation of the protection system.

A third implementation of the protection system is described below with reference to FIG. 5, this implementation likewise implementing an encryption algorithm of the asymmetrical type. In this implementation, the programs stored in the memory of the card 24 also include an algorithm 46 for generating a random number R2. These programs also include a program 48 for combining two numbers, which combination consists in summing two numbers in the implementation described. Clearly it is possible to envisage other linear combinations of the two numbers. The specific subprograms associated with the software include the subprograms described above with reference to FIG. 4 and also a subprogram 48' for combining two numbers, this subprogram being identical to the subprogram 48.

When executing this implementation of the protection system, the random number generator 41 generates a random number R1 which is transmitted to the read/write device and then to the circuits of the memory card 24. On the other hand, the microprocessor of the card activates the random number generator function 46 which thus generates the number R2. The combination function 48 then sums the numbers R1 and R2. Thereafter the encryption algorithm of the asymmetrical public key $K_{pub}$ and private key $K_{priv}$ type is applied firstly to the second random number R2 by using the private key which gives a first number S1 in a step 50, and the same encryption algorithm is applied to the combination of the numbers R1+R2 in a step 52 which gives a second number S2. The numbers generated in this way, S1 and S2, are transmitted to the computer machine and to the specific subprograms of the software. The second encryption algorithm $E^{-1}$ (which may or may not be the same as the above-mentioned first encryption algorithm) is applied in step 51 to the first number S1 using the public key, thus making it possible in normal operation (i.e. with a properly associated card) to obtain the second random number R2. In step 48', the sum R1+R2 is calculated and in step 54 the second encryption algorithm $E^{-1}$ is applied to the number S2 using the public key. The result obtained by implementing the second encryption algorithm is then compared with the sum of the numbers R1+R2. If the comparison is positive, then the operation is repeated, possibly after a time lapse. New random numbers R1 and R2 are then issued under control of the output 56 from step 54. Otherwise, execution of the software is interrupted.

Implementing the software protection system requires a private key, i.e. a secret key to be stored in the card held by the user of the software.

Since the computer machine used for executing the software can download the software over a temporary or permanent network, it would be advantageous to enable the private key to be transmitted over the same network for storage in the card, with the key being issued by the supplier of the software. Naturally, it is necessary for the key to be transmitted to the user's card under conditions of security such that neither the user nor an attacker connected to the network can have access thereto.

Various procedures are known that enable a user having a microprocessor card to engage in dialog over a network with an operator under conditions which ensure that the information transmitted is protected from third parties and from the user while nevertheless being certain that the user is indeed the person having the right to receive the information.

By way of example, one such procedure is described in French patent application No. 98 05484 filed on Apr. 30, 1998 in the name of the Applicant.

In this improved version, the complete system thus makes it possible not only to protect the software while it is being executed, but it also makes it possible to use a network for downloading the software into the computer machine and also for loading the memory of the microprocessor card with the private key that is necessary to enable the software to be used.

We claim:

1. A system for protecting software executable on a computer machine, the system being of the type in which said software is associated with a memory card for insertion in a read/write device connected to said computer machine, and being characterized in that:

said software comprises:
   means for storing a public key or value;
   means for periodically generating a pseudo-random number and for transmitting said pseudo-random number to said read/write device;
   means for implementing a first algorithm using said value or public key on receiving information from the read/write device;
   comparator means for comparing the result of implementing said first algorithm with said pseudo-random number; and
   means for interrupting the execution of said software in response to said comparison; and in that said card comprises:
      protected memory means for storing an associated private value or key;
      means for implementing a second algorithm associated with said first algorithm and using said private value or key on receiving information issued by said computer machine, thereby obtaining encoded information; and
      means for transmitting said encoded information to said computer machine.

2. A protection system according to claim 1, characterized in that said first and second algorithms are algorithms of the asymmetrical public key and private key type.

3. A protection system according to claim 2, characterized in that said card further comprises:
   means for generating an auxiliary pseudo-random number;
   means for applying said second encryption algorithm to said auxiliary pseudo-random number;
   means for combining the pseudo-random number and the auxiliary pseudo-random number;
   means for applying said second algorithm to said combination of the numbers; and
   means for transmitting the encrypted number and the encrypted combination to said computer machine;
and in that said software comprises:
   means for applying said first encryption algorithm to said encrypted number and to said encrypted combination; and
   means for combining said pseudo-random number and the result of implementing said first algorithm on said encrypted auxiliary pseudo-random number.

4. A protection system according to claim 1, characterized in that said first and second algorithms are zero disclosure algorithms.

5. A protection system according to any one of claims 1 to 4, characterized in that the public and private keys or values are the same for all pieces of software.

6. A protection system according to any one of claims 1 to 4, characterized in that said public and private keys or values are specific to each piece of software.

7. A system for protecting software according to any one of claims 1 to 4, characterized in that it further comprises network means for downloading said software from a supplier and into the computer machine, means using said card to request said supplier to supply the private value or key associated with said software over the network, and means for receiving in return said private value or key in encrypted form and for decrypting it in the card so as to store it in decrypted form.

* * * * *